(12) United States Patent
Gunasekera et al.

(10) Patent No.: US 11,946,391 B2
(45) Date of Patent: Apr. 2, 2024

(54) TURBINE ENGINE WITH COMPOSITE AIRFOIL HAVING A NON-METALLIC LEADING EDGE PROTECTIVE WRAP

(71) Applicant: General Electric Company, Schenectady, NY (US)

(72) Inventors: Anthony Michael Gunasekera, New Richmond, OH (US); Nicholas Joseph Kray, Mason, OH (US); Leslie Louis Langenbrunner, Cincinnati, OH (US); Simeon Paul Copple, Wilmington, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/198,843

(22) Filed: Mar. 11, 2021

(65) Prior Publication Data
US 2022/0290572 A1 Sep. 15, 2022

(51) Int. Cl.
*F01D 9/04* (2006.01)
*B64C 11/26* (2006.01)
(Continued)

(52) U.S. Cl.
CPC .............. *F01D 9/041* (2013.01); *B64C 11/26* (2013.01); *F01D 5/282* (2013.01); *F01D 25/005* (2013.01);
(Continued)

(58) Field of Classification Search
CPC ........ F01D 9/041; F01D 5/282; F01D 25/005; F04D 29/388; B64C 11/26; F05D 2220/323; F05D 2240/12; F05D 2240/30
See application file for complete search history.

(56) References Cited

U.S. PATENT DOCUMENTS 4,892,462 A   1/1990 Barbier et al.
5,123,814 A * 6/1992 Burdick ................ F04D 29/388
                                                29/889.3
(Continued)

FOREIGN PATENT DOCUMENTS

EA   0753098 B1   3/1998
EP   0753098 A1   3/1998

OTHER PUBLICATIONS

"Graphite-Epoxy Composites," by Park et al 2011; p. 4 (Year: 2011).*
(Continued)

*Primary Examiner* — Brian Christopher Delrue
(74) *Attorney, Agent, or Firm* — Dority & Manning, P.A.

(57) ABSTRACT

A composite airfoil having a non-metallic leading edge protective wrap is provided. In one aspect, the airfoil has a composite core having a pressure sidewall and a suction sidewall each extending between a core leading edge and a core trailing edge. A leading edge protective wrap protects the core leading edge and includes a trailing wrap and a leading wrap. The trailing wrap wraps around the core leading edge and is connected to the composite core. The leading wrap wraps around the core leading edge and is connected to the trailing wrap. The trailing and leading wraps both have leading edges that are spaced from one another. A filler is positioned between the leading edges of the trailing and leading wraps. A protective nose is connected to the leading edge of the leading wrap. The components of the leading edge protective wrap are formed of non-metallic materials.

14 Claims, 8 Drawing Sheets

(51) Int. Cl.
  *F01D 5/28* (2006.01)
  *F01D 25/00* (2006.01)
  *F04D 29/38* (2006.01)

(52) U.S. Cl.
  CPC ...... *F04D 29/388* (2013.01); *F05D 2220/323* (2013.01); *F05D 2240/12* (2013.01); *F05D 2240/30* (2013.01)

(56) References Cited

U.S. PATENT DOCUMENTS

| | | | | |
|---|---|---|---|---|
| 5,222,297 | A * | 6/1993 | Graff | B29C 70/865 |
| | | | | 29/889.7 |
| 5,375,978 | A * | 12/1994 | Evans | B64C 11/26 |
| | | | | 416/241 A |
| 5,392,514 | A * | 2/1995 | Cook | B29D 99/0028 |
| | | | | 29/889.7 |
| 5,449,273 | A | 9/1995 | Hertel et al. | |
| 5,672,417 | A | 9/1997 | Champenois et al. | |
| 5,876,651 | A * | 3/1999 | Blackburn, Jr. | F01D 5/282 |
| | | | | 29/889.71 |
| 8,851,421 | B2 * | 10/2014 | Jevons | F04D 29/324 |
| | | | | 244/123.1 |
| 9,523,280 | B2 | 12/2016 | Pilpel et al. | |
| 10,414,487 | B2 * | 9/2019 | Laurenceau | B29C 70/48 |
| 10,549,842 | B2 * | 2/2020 | Andrzejewski | B64C 11/26 |
| 2011/0229337 | A1 * | 9/2011 | Carper | F01D 5/284 |
| | | | | 416/241 B |
| 2012/0152893 | A1 * | 6/2012 | Parkos | F01D 5/005 |
| | | | | 156/60 |
| 2013/0236323 | A1 * | 9/2013 | Mironets | C23C 24/04 |
| | | | | 29/889 |
| 2013/0269159 | A1 * | 10/2013 | Robitaille | B29B 11/16 |
| | | | | 28/143 |
| 2013/0272893 | A1 * | 10/2013 | Fabre | B29C 70/24 |
| | | | | 416/226 |
| 2017/0254212 | A1 * | 9/2017 | Pautard | B29C 45/40 |
| 2019/0071549 | A1 * | 3/2019 | Koshi | B29B 15/08 |
| 2019/0242399 | A1 | 8/2019 | Kray et al. | |
| 2019/0308376 | A1 | 10/2019 | Backhouse et al. | |

OTHER PUBLICATIONS

"Ceramic composition and properties", Britannica Encyclopedia, Jan. 24, 2011 (Year: 2011).*

* cited by examiner

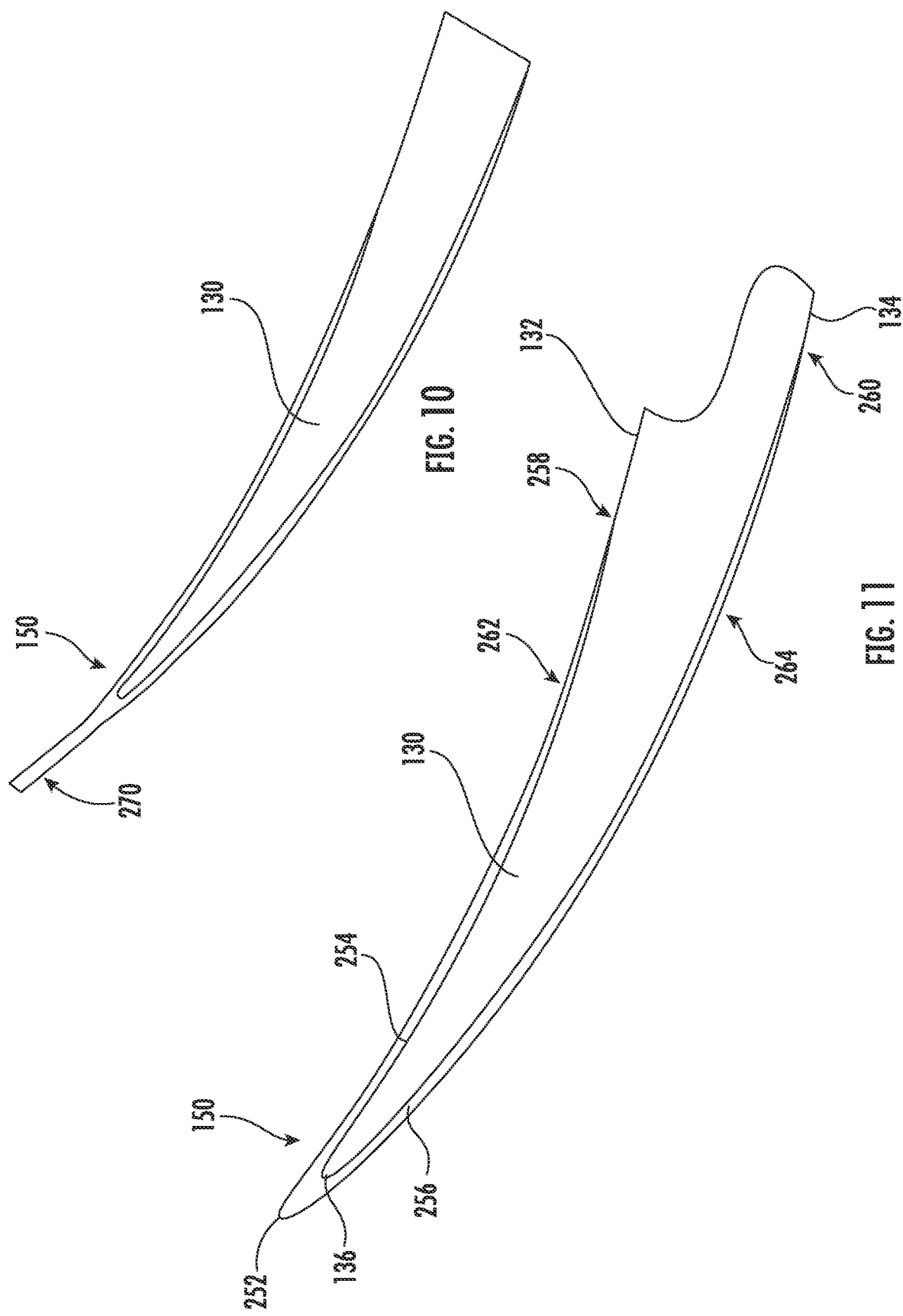

TURBINE ENGINE WITH COMPOSITE AIRFOIL HAVING A NON-METALLIC LEADING EDGE PROTECTIVE WRAP

FEDERALLY SPONSORED RESEARCH

This invention was made with United States Government support. The Government has certain rights in this invention.

FIELD

The present subject matter relates generally to turbine engines, and more particularly, to turbine engines having composite airfoils.

BACKGROUND

Some gas turbine engines include composite airfoils. For instance, aviation gas turbine engines can include composite fan blades as well as composite airfoils in their compressor and/or turbine sections. Some composite airfoils for gas turbine engines may require leading edge protection, e.g., for protection against erosion, Foreign Object Debris (FOD), and/or bird strike threats. The inventors of the present disclosure have invented various composite airfoils equipped with leading edge protection and methods of forming such composite airfoils.

BRIEF DESCRIPTION

Aspects and advantages of the invention will be set forth in part in the following description, or may be obvious from the description, or may be learned through practice of the invention.

In one aspect, an airfoil for a turbine engine is provided. The airfoil includes a composite core having a pressure sidewall and a suction sidewall extending between a core leading edge and a core trailing edge. Further, the airfoil includes a leading edge protective wrap. The leading edge protective wrap includes a trailing wrap wrapped around the core leading edge and connected to the pressure sidewall and the suction sidewall of the composite core, the trailing wrap having a leading edge and having a pressure sidewall and a suction sidewall. Further, the leading edge protective wrap includes a leading wrap wrapped around the core leading edge and the leading edge of the trailing wrap and connected to the pressure sidewall and the suction sidewall of the trailing wrap, the leading wrap having a leading edge that is spaced from the leading edge of the trailing wrap. The leading edge protective wrap also includes a filler positioned between the leading edge of the trailing wrap and the leading edge of the leading wrap.

In another aspect, an airfoil for a turbine engine is provided. The airfoil includes a composite core having a pressure sidewall and a suction sidewall each extending between a core leading edge and a core trailing edge. Further, the airfoil includes a leading edge protective wrap. The leading edge protective wrap includes a trailing wrap wrapped around the core leading edge and connected to the pressure sidewall and the suction sidewall of the composite core, the trailing wrap having a pressure sidewall and a suction sidewall. In addition, the leading edge protective wrap includes a nose laminate, the nose laminate forming a butt joint with the leading edge of the trailing wrap. In addition, the leading edge protective wrap includes a leading wrap having a pressure sidewall and a suction sidewall, the pressure sidewall of the leading wrap being connected at least in part to the pressure sidewall of the trailing wrap and at least in part to the nose laminate, the suction sidewall of the leading wrap being connected at least in part to the suction sidewall of the trailing wrap and at least in part to the nose laminate.

In another exemplary aspect, an airfoil for a turbine engine is provided. The airfoil includes a composite core having a pressure sidewall and a suction sidewall extending between a core leading edge and a core trailing edge. Further, the airfoil includes a leading edge protective wrap wrapped around the core leading edge and connected to the pressure sidewall and the suction sidewall of the composite core, the leading edge protective wrap being formed of a 3D woven material.

In a further aspect, a method of forming an airfoil is provided. The method includes laying up a composite core, the composite core having a first sidewall and a second sidewall connected at a core leading edge. The method further includes wrapping a trailing wrap around the core leading edge of the composite core, the trailing wrap having a first sidewall and a second sidewall connected at a leading edge. The method also includes wrapping a leading wrap around the core leading edge of the composite core and the leading edge of the trailing wrap.

In yet another aspect, a method of forming an airfoil is provided. The method includes laying up a composite core, the composite core having a core leading edge. The method further includes wrapping a trailing wrap around the core leading edge of the composite core, the trailing wrap having a first sidewall and a second sidewall connected at a leading edge. The method also includes laying up a first sidewall of a leading wrap along the first sidewall of the trailing wrap. The method also includes laying up a nose laminate at least in part on the first sidewall of the leading wrap, the nose laminate forming a butt joint with the leading edge of the trailing wrap. In addition, the method includes laying up a second sidewall of the leading wrap at least in part on the nose laminate and at least in part on the second sidewall of the trailing wrap. The method also includes machining a leading edge radius of the airfoil.

In a further aspect, a method of forming an airfoil is provided. The method includes laying up a composite core, the composite core having a first sidewall and a second sidewall connected at a core leading edge. The method also includes wrapping a 3D woven leading edge wrap around the core leading edge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 provides a cross-sectional view of an airfoil having a leading edge wrap prior to being machined; and FIG. 11 provides a close-up cross-sectional view of the leading edge wrap of the airfoil of FIG. 10 after being machined to specification.

DETAILED DESCRIPTION

Figure 1:
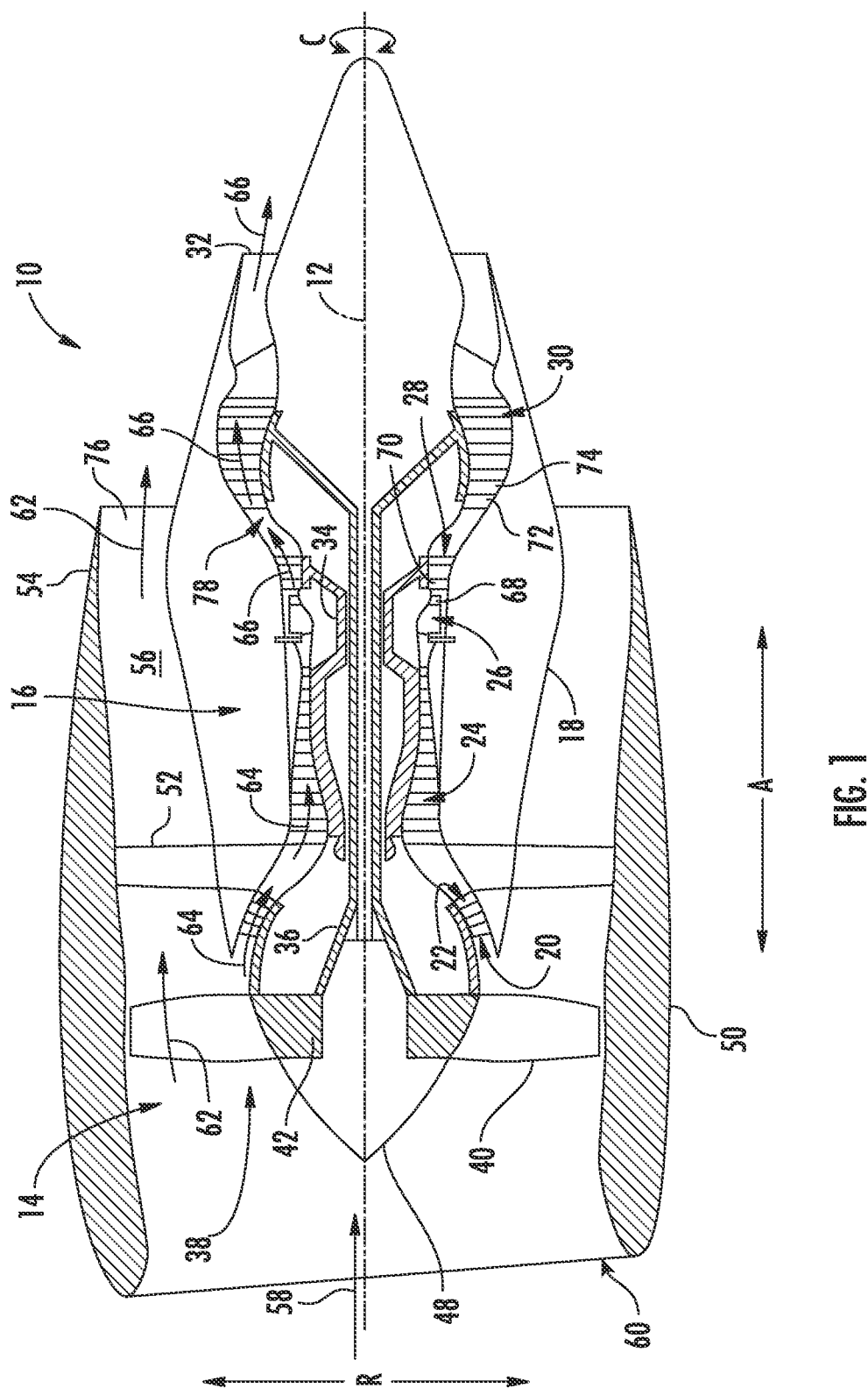
FIG. 1 is a schematic cross-sectional view of an exemplary aviation gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Aspects of the present disclosure are directed to a composite airfoil having a non-metallic leading edge protective wrap. Conventionally, metallic wraps have been used on composite airfoils for leading edge protection. The inventors of the present disclosure have recognized that there are certain challenges with metallic-wrapped airfoils. For instance, such a metallic-wrapped airfoil can break away from its composite core during operation of the turbomachine in which the airfoil is positioned. As a result, the composite core of the airfoil can become exposed to the elements and damage can occur to other components downstream of the airfoil, among other drawbacks. Accordingly, to address these challenges, the inventors have invented various composite airfoils equipped with non-metallic leading edge protective wraps and methods of forming such airfoils. Composite airfoils equipped with a non-leading edge protective wrap can be incorporated into any suitable turbomachine, such as an aviation gas turbine engine.

In one aspect, an airfoil for a turbine engine is provided. In some embodiments, the airfoil is situated at least in part within a core air flowpath of a core engine of a gas turbine engine. For instance, the airfoil can be situated in a compressor section or a turbine section of the core engine. In other embodiments, the airfoil can be situated in other suitable locations. For instance, the airfoil can be a fan blade situated in a fan section upstream of the core engine.

The airfoil has a composite core. The composite core can be formed of any suitable composite material, such as a Ceramic Matrix Composite (CMC) material or a Polymer Matrix Composite (PMC) material. The composite core has a pressure sidewall and a suction sidewall each extending between and connected at a core leading edge and a core trailing edge. In this way, the composite core defines an airfoil shape. The airfoil also includes a non-metallic leading edge protective wrap. The leading edge protective wrap has two wraps, including a trailing wrap and a leading wrap. The trailing wrap is wrapped around the core leading edge of the composite core. In this regard, the trailing wrap is positioned adjacent to the composite core. Specifically, the trailing wrap has a pressure sidewall and a suction sidewall. The pressure sidewall of the trailing wrap is connected to the pressure sidewall of the composite core and the and the suction sidewall of the trailing wrap is connected to the suction sidewall of the composite core. The trailing wrap has a leading edge that is generally aligned with the core leading edge of the composite core.

The leading wrap is wrapped around the core leading edge of the composite core and the leading edge of the trailing wrap. The leading wrap is connected to the pressure sidewall and the suction sidewall of the trailing wrap. The leading wrap has a leading edge that is spaced from the leading edge of the trailing wrap. The leading edge of the leading wrap leads or is upstream of the leading edge of the trailing wrap. The leading wrap is thinner or less thick than the trailing wrap. The relatively thin leading wrap can be used to form the sharp leading edge radius of the airfoil and the relatively thick trailing wrap can provide structural integrity at the leading edge. A filler is positioned between the leading edge of the trailing wrap and the leading edge of the leading wrap. The leading edge protective wrap can also include a protective nose connected to the leading edge of the leading wrap. The protective nose can protect the leading edge of the airfoil from erosion, for example. In addition, the airfoil can be coated with a protective coating to protect the airfoil from erosion, among other things.

The various components of the leading edge protective wrap can be formed of non-metallic materials. For instance, one or both of the trailing wrap and the leading wrap can be formed of a non-metallic material. The non-metallic material can be a fibrous composite material. By way of example, the fibrous composite material can be formed of at least one of an S-glass, carbon, thermoplastic fibers, E-glass, and Kevlar material. In some embodiments, at least one of the leading wrap and the trailing wrap is formed of a fibrous material having fibers that wrap unbroken around the core leading edge. This can improve the ruggedness of the airfoil. By utilizing a non-metallic leading edge protective wrap, the risk of downstream damage to other engine components is reduced, especially for airfoils that are situated upstream of subsequent downstream rotor stages.

In another aspect, an airfoil for a turbine engine is provided. The airfoil includes a composite core having a pressure sidewall and a suction sidewall each extending between a core leading edge and a core trailing edge. The airfoil includes a leading edge protective wrap. The leading edge protective wrap is formed of one or more non-metallic materials. The leading edge protective wrap includes a trailing wrap wrapped around the core leading edge. The trailing wrap is connected to the pressure sidewall and the suction sidewall of the composite core. Particularly, the trailing wrap has a pressure sidewall and a suction sidewall. The pressure sidewall of the trailing wrap is connected to or otherwise positioned adjacent to the pressure sidewall of the composite core and the suction sidewall of the trailing wrap is connected to or otherwise positioned adjacent to the suction sidewall of the composite core. The leading edge of the trailing wrap is generally aligned with the core leading edge of the composite core.

The leading edge protective wrap also includes a nose laminate formed of one or more plies. The nose laminate forms a butt joint with the leading edge of the trailing wrap. The leading edge protective wrap further includes a leading wrap having a pressure sidewall and a suction sidewall. The pressure sidewall of the leading wrap is connected at least in part to the pressure sidewall of the trailing wrap and at least in part to the nose laminate. The suction sidewall of the leading wrap is connected at least in part to the suction sidewall of the trailing wrap and at least in part to the nose laminate. In some embodiments, excess stock of the nose laminate and the leading wrap can be machined so that the leading edge of the airfoil can be machined to specification. In such embodiments, the resultant leading edge radius can be formed in part by the nose laminate and in part by the leading wrap. The pressure and suction sidewalls of the leading wrap may be non-contiguous in forming the resultant leading edge radius of the airfoil. The leading edge protective wrap can also include a protective nose connected to the resultant leading edge of the airfoil. In addition, the airfoil can be coated with a protective coating to protect the airfoil from erosion, among other things.

In yet another aspect, an airfoil for a turbine engine is provided. The airfoil includes a composite core having a pressure sidewall and a suction sidewall each extending between a core leading edge and a core trailing edge. The airfoil includes a leading edge protective wrap wrapped around the core leading edge and connected to the pressure sidewall and the suction sidewall of the composite core. The leading edge protective wrap can be formed of a non-metallic material. Notably, the leading edge protective wrap is formed of a 3D woven material.

Referring now to the drawings, FIG. 1 provides a schematic cross-sectional view of a turbomachine embodied as a gas turbine engine for an aerial vehicle. For the embodiment of FIG. 1, the aviation gas turbine engine is a high-bypass turbofan jet engine 10, referred to herein as "turbofan 10." The turbofan 10 defines an axial direction A (extending parallel to a longitudinal centerline 12) and a radial direction R that is normal to the axial direction A. The turbofan 10 also defines a circumferential direction C that extends three hundred sixty degrees (360°) around the longitudinal centerline 12.

The turbofan 10 includes a fan section 14 and a core engine 16 disposed downstream of the fan section 14. The core engine 16 includes a substantially tubular engine cowl 18 that defines an annular core inlet 20. As schematically shown in FIG. 1, the engine cowl 18 encases, in serial flow relationship, a compressor section including a booster or low pressure (LP) compressor 22 followed downstream by a high pressure (HP) compressor 24; a combustion section 26; a turbine section including an HP turbine 28 followed downstream by an LP turbine 30; and a jet exhaust nozzle section 32. The compressor section, combustion section 26, turbine section, and nozzle section 32 together define a core air flowpath. An HP shaft or spool 34 drivingly connects the HP turbine 28 to the HP compressor 24 to rotate them in unison concentrically with respect to the longitudinal centerline 12. An LP shaft or spool 36 drivingly connects the LP turbine 30 to the LP compressor 22 to rotate them in unison concentrically with respect to the longitudinal centerline 12. Thus, the LP shaft 36 and HP shaft 34 are each rotary components, rotating about the axial direction A during operation of the turbofan 10. The turbofan 10 can include a plurality of bearings to support such rotary components.

The fan section 14 includes a fan 38 having a plurality of fan blades 40 coupled to a disk 42 in a spaced apart manner. The fan blades 40 extend outward from the disk 42 along the radial direction R. The fan blades 40 and the disk 42 are together rotatable about the longitudinal axis 12. The disk 42 is covered by a rotatable spinner 48 aerodynamically contoured to promote an airflow through the plurality of fan blades 40. In addition, the fan section 14 includes an annular fan casing or outer nacelle 50 that circumferentially surrounds the fan 38 and/or at least a portion of the core engine 16. The nacelle 50 is supported relative to the core engine 16 by a plurality of circumferentially-spaced outlet guide vanes 52. Alternatively, the nacelle 50 also may be supported by struts of a structural fan frame. Moreover, a downstream section 54 of the nacelle 50 extends over an outer portion of the core engine 16 so as to define a bypass airflow passage 56 therebetween.

During operation of the turbofan 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or more specifically into the annular core inlet 20 of the LP compressor 22. The pressure of the second portion of air 64 is then increased as it is routed through the high pressure (HP) compressor 24. The high pressure air 64 is then discharged into the combustion section 26 where the air 64 is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the engine cowl 18 and HP turbine rotor blades 70 that are coupled to the HP shaft or spool 34, thus causing the HP shaft or spool 34 to rotate, thereby supporting operation of the HP compressor 24. The combustion gases 66 then flow downstream into and expand through the LP turbine 30 where a second portion of thermal and kinetic energy is extracted from the combustion gases 66 via sequential stages of LP turbine stator vanes 72 that are coupled to the engine cowl 18 and LP turbine rotor blades 74 that are coupled to the LP shaft or spool 36, thus causing the LP shaft or spool 36 to rotate, thereby supporting operation of the LP compressor 22 and rotation of the fan 38.

The combustion gases 66 are subsequently routed through the jet exhaust nozzle section 32 of the core engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core engine 16.

It should be appreciated that the exemplary turbofan 10 depicted in FIG. 1 is by way of example only, and that in other exemplary embodiments, the turbofan 10 may have any other suitable configuration. For example, in other exemplary embodiments, the fan 38 may be configured in any other suitable manner (e.g., as a variable pitch fan) and further may be supported using any other suitable fan frame configuration. Moreover, it also should be appreciated that in other exemplary embodiments that any other suitable HP compressor 24 and HP turbine 28 configurations may be utilized. It also should be appreciated, that in still other exemplary embodiments, aspects of the present disclosure may be incorporated into any other suitable type of gas turbine engine. For example, aspects of the present disclosure may be incorporated into, e.g., a turboshaft engine, turboprop engine, turbojet engine, industrial and marine gas turbine engines, auxiliary power units, etc.

Further, in some embodiments, the turbofan 10 has one or more airfoils formed of a composite material, such as a CMC material or a PMC material. Composite airfoils formed of CMC material for aviation gas turbine engines are typically found in the hot section of the core engine 16, such as in the turbine section. For instance, the airfoils of the HP turbine nozzles, or the HP turbine stator vanes 68, can be formed of CMC material. Further, the airfoils of the HP turbine rotor blades 70 can be formed of a CMC material. Airfoils in the LP turbine 30 can also be formed of CMC material. Composite airfoils formed of PMC material for aviation gas turbine engines are typically found upstream of the hot section of the core engine 16, such as in the compressor section and the fan section 14. For instance, the airfoils of the LP and HP compressor nozzles and the compressor blades of the LP and HP compressors 22, 24 can be formed of PMC material. Further, the fan blades 40 of the fan 38 can be formed of a PMC material. In accordance with the inventive aspects of the present disclosure, a composite airfoil having a leading edge protective wrap that provides leading edge protection against erosion, Foreign Object Debris (FOD), and bird strike threats, among other things, is disclosed herein. The leading edge protective wrap can be used with or applied to any suitable composite airfoil of a turbine engine, such as any of the airfoils noted above.

Figure 2:
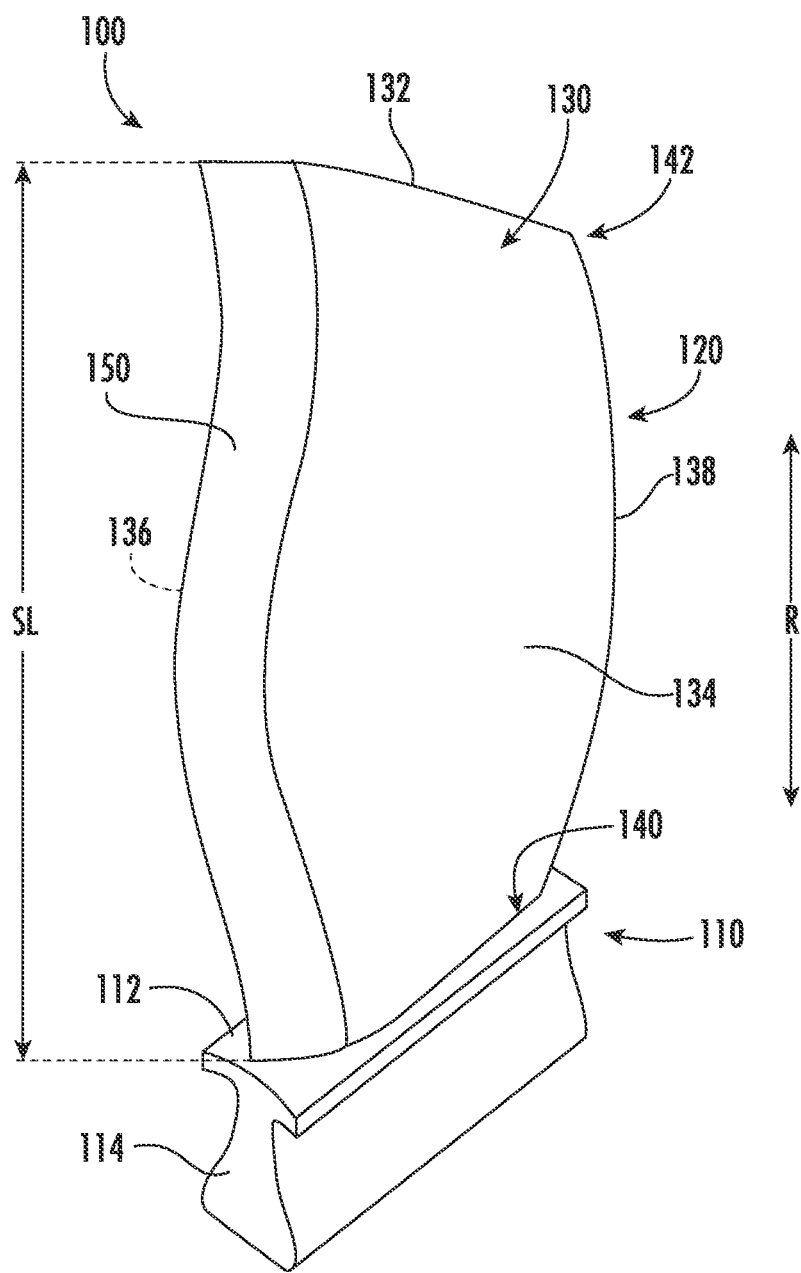
FIG. 2 provides a perspective view of a fan blade according to an example embodiment of the present subject matter.
Figure 3:
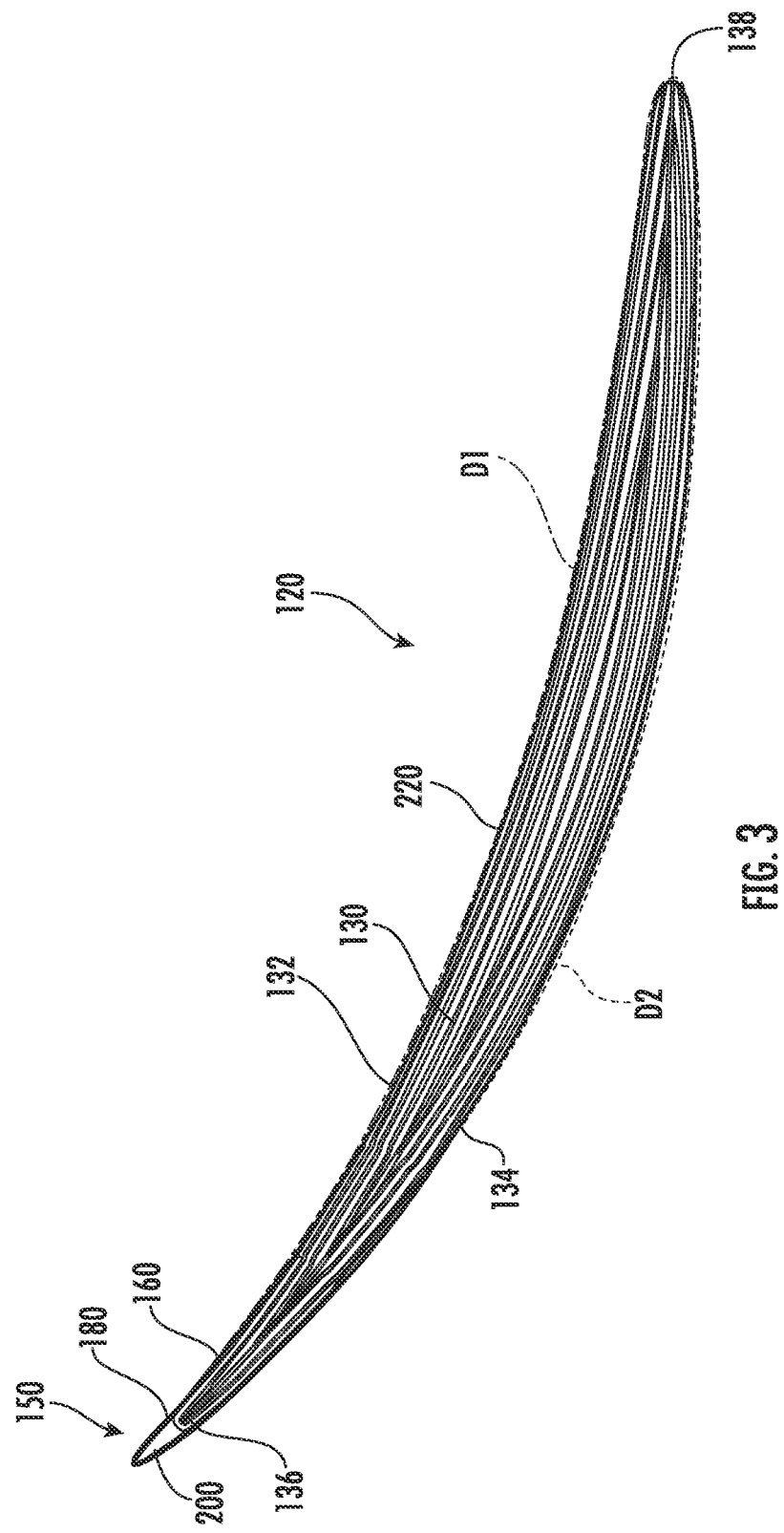
FIG. 3 provides a cross-sectional view of an airfoil of the fan blade of FIG. 2.
Figure 4:
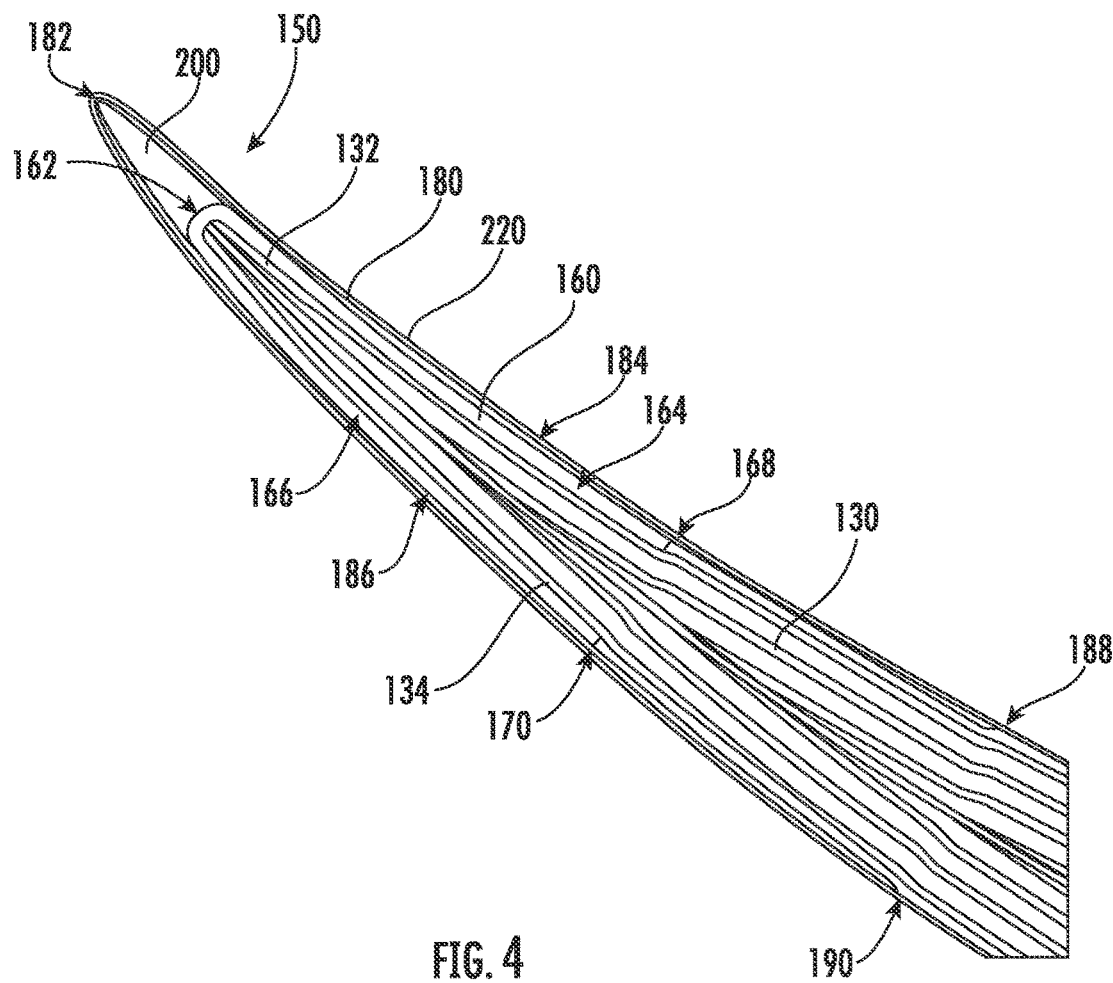
FIGS. 4 and 5 provide close-up cross-sectional views of the airfoil of the fan blade of FIG. 2.
Figure 5:
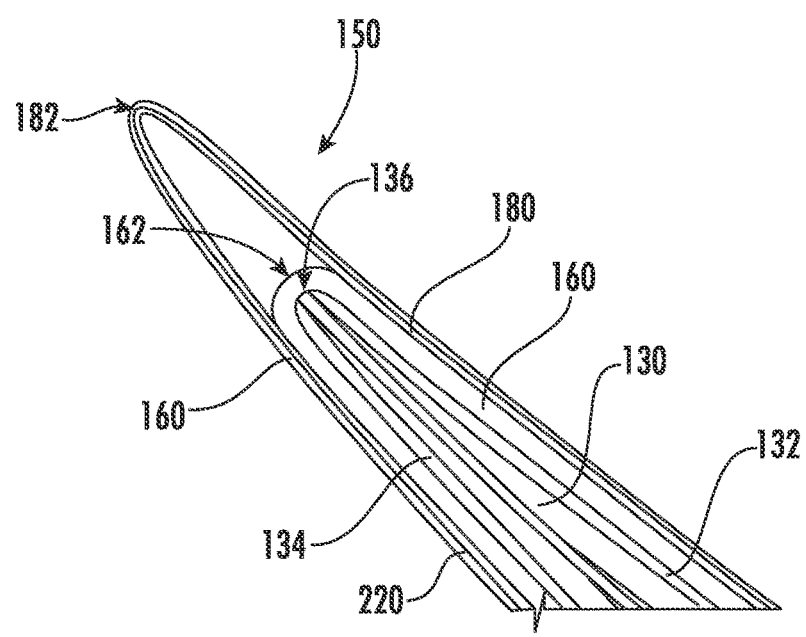
Figure 6:
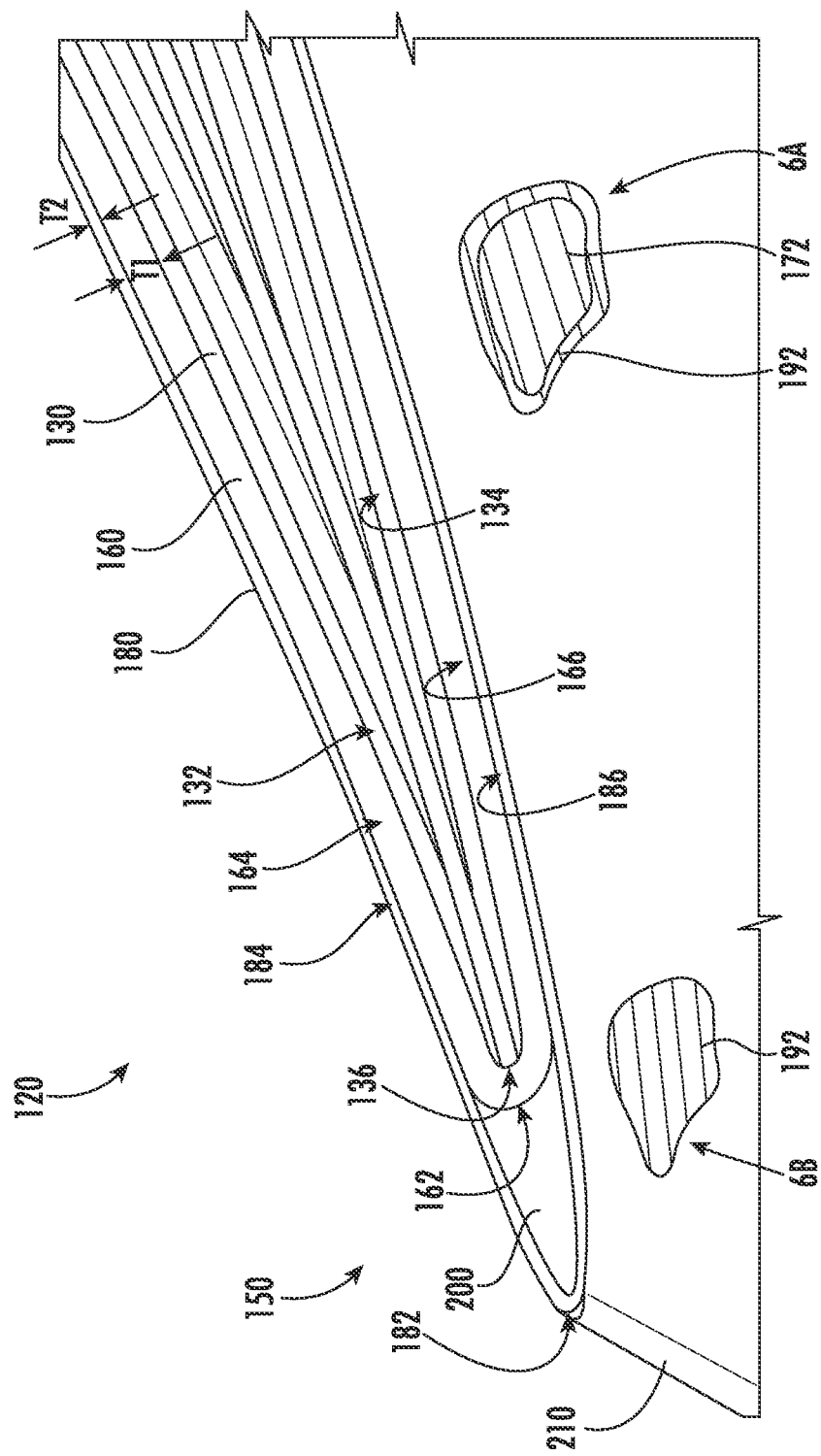
FIG. 6 provides a close-up, perspective cross-sectional view of the airfoil of the fan blade 100 of FIG. 2.

With reference now to FIGS. 2, 3, 4, 5, and 6, various views are provided of an engine component having a composite airfoil equipped with a leading edge protective wrap. Particularly, FIG. 2 provides a perspective view of an engine component having a composite airfoil equipped with a leading edge protective wrap 150. In FIG. 2 the engine component is a fan blade 100 of an aviation gas turbine engine. FIG. 3 provides a cross-sectional view of an airfoil 120 of the fan blade 100 of FIG. 2. FIGS. 4 and 5 provide close-up cross-sectional views of the airfoil 120 of the fan blade 100 of FIG. 2. FIG. 6 provides a close-up, perspective cross-sectional view of the airfoil 120 of the fan blade 100 of FIG. 2. Although the leading edge protective wrap 150 is disclosed in this example embodiment as being applied to an airfoil of a fan blade for an aviation gas turbine engine, it will be appreciated that the leading edge protective wrap 150 can be applied to other suitable composite airfoils of a gas turbine engine or turbomachine.

As depicted in FIG. 2, the fan blade 100 includes a root 110 and an airfoil 120. The root 110 includes a platform 112 and a dovetail 114. The dovetail 114 connects the fan blade 100 with a fan disk, such as the fan disk 42 depicted in FIG. 1. Generally, the airfoil 120 extends lengthwise outward from the root 110, e.g., along the radial direction R.

The airfoil 120 has a composite core 130. The composite core 130 has a pressure sidewall 132 and a suction sidewall 134 extending between a core leading edge 136 (hidden by the leading edge protective wrap 150 in FIG. 2; see FIG. 5) and a core trailing edge 138. As shown best in FIG. 3, the pressure sidewall 132 has a concave shape while the suction sidewall 134 has a convex shape. The pressure sidewall 132 and the suction sidewall 134 are joined together at the core leading edge 136 and the core trailing edge 138 to define an airfoil shape. During operation, the fan blade 100 rotates in a direction such that the pressure sidewall 132 follows the suction sidewall 134. Thus, as shown in FIG. 2, the fan blade 100 would rotate into the page. Moreover, the composite core 130 of the airfoil 120 extends between a base 140 and a tip 142, e.g., along the radial direction R. A span length SL is defined between the base 140 and the tip 142 as shown in FIG. 2. The base 140 of the airfoil 120 is connected to the root 110.

In some embodiments, the composite core 130 is formed of a composite material. For instance, for this embodiment, the composite core 130 is formed of a PMC material. In other embodiments, the composite core 130 can be formed of a CMC material. Exemplary matrix materials for a CMC composite core can include silicon carbide, silicon, silica, alumina, or combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). Such CMC materials may have coefficients of thermal expansion in the range of about $1.3 \times 10^{-6}$ in/in/° F. to about $3.5 \times 10^{-6}$ in/in/° F. in a temperature range of approximately 1000-1200° F. In yet other embodiments, the composite core 130 can be formed of other suitable composite materials.

Notably, the airfoil 120 includes a leading edge protective wrap 150. The leading edge protective wrap 150 protects the composite core 130, especially at its core leading edge 136. For instance, the leading edge protective wrap 150 can protect the core leading edge 136 from erosion, FOD, and bird strike threats, among other things. For this embodiment, the leading edge protective wrap 150 includes a trailing wrap 160 wrapped around the core leading edge 136 of the composite core 130. Generally, the trailing wrap 160 enhances the structural integrity of the airfoil 120 and is particularly useful for preventing or minimizing structural damage to the airfoil 120, e.g., from bird strikes. As depicted best in FIG. 4, the trailing wrap 160 is connected to the pressure sidewall 132 and the suction sidewall 134 of the composite core 130. More specifically, the trailing wrap 160 has a pressure sidewall 164 and a suction sidewall 166. The trailing wrap 160 also has a leading edge 162. The pressure sidewall 164 of the trailing wrap 160 is connected to or otherwise positioned adjacent to the pressure sidewall 132 of the composite core 130 and the suction sidewall 166 of the trailing wrap 160 is connected to or otherwise positioned adjacent to the suction sidewall 134 of the composite core 130. The trailing wrap 160 extends between a pressure side end 168 and a suction side end 170. In this regard, the trailing wrap 160 terminates at one end at the pressure side end 168 and at its other end at the suction side end 170.

The leading edge protective wrap 150 also includes a leading wrap 180 wrapped around the core leading edge 136 of the composite core 130 and the leading edge 162 of the trailing wrap 160. That is, the leading wrap 180 is wrapped around the leading edge 162 of the trailing wrap 160, which is in turn wrapped around core leading edge 136 of the composite core 130. Thus, the leading wrap 180 is an outer wrap with respect to the trailing wrap 160.

The leading wrap 180 has a leading edge 182 that is spaced from the leading edge 162 of the trailing wrap 160. The leading edge 182 of the leading wrap 180 leads or is positioned or situated upstream of the leading edge 162 of the trailing wrap 160; hence the leading and trailing denotations of the leading and trailing wraps 160, 180. As depicted, the leading wrap 180 is connected to the pressure sidewall 164 and the suction sidewall 166 of the trailing wrap 160. More specifically, the leading wrap 180 has a pressure sidewall 184 and a suction sidewall 186. The pressure sidewall 184 of the leading wrap 180 is connected to or otherwise positioned adjacent to the pressure sidewall 164 of the trailing wrap 160 and the suction sidewall 186 of the leading wrap 180 is connected to or otherwise positioned adjacent to the suction sidewall 166 of the trailing wrap 160. The leading wrap 180 extends between a pressure side end 188 and a suction side end 190. In this regard, the leading wrap 180 terminates at one end at the pressure side end 188 and at its other end at the suction side end 190.

In addition, the leading edge protective wrap 150 further includes a filler 200. The filler 200 is generally positioned between the leading edge 162 of the trailing wrap 160 and the leading edge 182 of the leading wrap 180. The filler 200 fills the cavity formed between the trailing wrap 160 and the leading wrap 180 at the leading portion of the airfoil 120. The cavity formed between the trailing wrap 160 and the leading wrap 180 can extend between the base 140 and the tip 142 of the airfoil 120. The filler 200 can be filled into the entire cavity and thus can extend from the base 140 to the tip 142 or the span length SL of the composite core 130 between the trailing wrap 160 and the leading wrap 180. In some embodiments, for example, the trailing wrap 160, the leading wrap 180, and the filler 200 extend the span length SL of the composite core 130. In this way, the entire span of the core leading edge 136 of the composite core 130 can be protected by the leading edge protective wrap 150. In other embodiments, the leading edge protective wrap 150 need not protect the full span of the core leading edge 136 of the composite core 130.

The filler 200 can be formed of a non-metallic material, such as at least one of a resin, an adhesive, composite tows or fibrous bundle, a 2D weave or woven material, a 3D weave or woven material, rolled fibers, single toe material, and a preform (e.g., a preformed insert). In some embodiments, filler 200 is formed with the same resin used to form the composite core 130. In this way, the filler 200 can be co-molded with the composite core 130 and no subsequent bond is needed. In embodiments in which the filler 200 and the composite core 130 are co-molded, the sharp leading edge radius can be net molded.

In some embodiments, optionally, the leading edge protective wrap 150 can also include a protective nose 210 as shown in FIG. 6. The protective nose 210 is connected to the leading edge 182 of the leading wrap 180. The protective nose 210 is thus positioned upstream or forward of the leading wrap 180. Accordingly, the protective nose 210 forms the leading edge of the airfoil 120. Advantageously, the protective nose 210 can ward off or reduce erosion at the leading edge of the airfoil 120.

The protective nose 210 can extend from the base 140 to the tip 142 or the span length SL of the composite core 130. Accordingly, in some embodiments, the trailing wrap 160, the leading wrap 180, the filler 200, and the protective nose 210 each extend the span length SL of the composite core 130. Further, the protective nose 210 can be formed of any suitable non-metallic material. For instance, the protective nose 210 can be formed of any of the non-metallic materials noted herein and can be 2D or 3D woven. Accordingly, in some embodiments, the trailing wrap 160, the leading wrap 180, the filler 200, and the protective nose 210 can each be formed of a non-metallic material.

Further, in some embodiments, the airfoil 120 of the fan blade 100 can be coated with a protective coating 220, such as an environmental barrier coating. As shown in FIG. 3, the entire perimeter of the airfoil 120 can be coated with the protective coating 220. Particularly, as shown in FIG. 2, the protective coating 220 can be applied to the outer surface of the leading wrap 180 of the leading edge protective wrap 150, along the pressure and suction sides 132, 134 of the composite core 130, and around the trailing edge 138 of the composite core 138. The protective coating 220 can be applied along the entire perimeter of the airfoil 120 as well as along the entire span of the airfoil 120. The protective coating 220 can be applied to the outer surface of the protective nose 210 or the protective nose 210 can be added to the airfoil 120 after the protective coating 220 has been applied.

Components of the leading wrap protection wrap 150 can be formed of various non-metallic materials. In some embodiments, the trailing wrap 160 and the leading wrap 180 are formed of a non-metallic material. The non-metallic material forming the trailing wrap 160 and the leading wrap 180 can be a fibrous composite material, for example. For instance, in some embodiments, the fibrous composite material is formed of at least one of an S-glass, carbon, E-glass, and Kevlar material.

In some embodiments, at least one of the trailing wrap 160 and the leading wrap 180 is formed of a fibrous material having fibers that wrap unbroken around the core leading edge 136. The fibers of a given wrap run "unbroken" around the core leading edge 136 in that they run continuously from the pressure sidewall, around the leading edge, and to the suction sidewall of the given wrap. In some embodiments, at least one of the leading wrap 180 and the trailing wrap 160 is formed of a 3D weave having fibers that wrap unbroken around the core leading edge 136 of the composite core 130. In other embodiments, at least one of the leading wrap 180 and the trailing wrap 160 is formed of a 2D weave having fibers that wrap unbroken around the core leading edge 136 of the composite core 130.

As one example, as shown in FIG. 6, the trailing wrap 160 is formed of a non-metallic fibrous material having fibers 172 (only four fibers are shown in the cutaway 6A of the trailing wrap 160) that wrap unbroken around the core leading edge 136 of the composite core 130. The fibers 172 can form part of a 3D or 2D weave, for example. The fibers 172 run along at least a portion of the pressure sidewall 164, wrap around the leading edge 162 (and consequently the core leading edge 136), and continue running along the suction sidewall 166 of the trailing wrap 160. In some embodiments, one or more of the fibers 172 can run continuously or unbroken from the pressure side end 168 to the suction side end 170 of the trailing wrap 160. The unbroken fibers 172 of the trailing wrap 160 provide ruggedization to the airfoil 120.

As another example, as shown in FIG. 6, the leading wrap 180 is formed of a non-metallic fibrous material having fibers 192 (only five fibers are shown in the cutaway 6B of the leading wrap 180) that wrap unbroken around the core leading edge 136 of the composite core 130 and the leading edge 162 of the trailing wrap 160. The fibers 192 can form part of a 3D or 2D weave, for example. The fibers 192 run along at least a portion of the pressure sidewall 184, wrap around the leading edge 182 (and consequently the core leading edge 136 and the leading edge 162), and continue running along the suction sidewall 186 of the leading wrap 180. In some embodiments, one or more of the fibers 192 can extend continuously or unbroken from the pressure side end 188 to the suction side end 190 of the leading wrap 180. The unbroken fibers 192 of the leading wrap 180 provide ruggedization to the airfoil 120. In some embodiments, the fibers 192 of the leading wrap 180 and the fibers 172 of the trailing wrap 160 can run unbroken around the core leading edge 136 of the composite core 130.

As shown in FIG. 6, for this embodiment, the leading wrap 180 is thinner than the trailing wrap 160. The trailing wrap 160 has a first thickness T1 and the leading wrap 180 has a second thickness T2 that is less thick than the first thickness T1 of the trailing wrap 160. Stated another way, the trailing wrap 160 is thicker than the leading wrap 180. The thickness of the trailing wrap 160 can provide structural integrity to the composite core 130, particularly at the core leading edge 136. The thinner leading wrap 180 can be easily wrapped to shape to form a small or sharp leading edge radius of the airfoil 120. Thus, the two-wrap construction of the leading edge protective wrap 150 can enhance the structural integrity of the airfoil 120 whilst still being able to meet the sharp leading edge design intent of the airfoil 120. In some embodiments, the second thickness T2 of the leading wrap 180 is less than half the first thickness T1 of the trailing wrap 160. In some other embodiments, the second thickness T2 of the leading wrap 180 is less than one third the first thickness T1 of the trailing wrap 160. As one example, the leading wrap 180 can be ~0.003 mils thick and the trailing wrap can be ~0.009 mils thick.

In addition, the trailing wrap 160 can have different thicknesses. For instance, as noted, the trailing wrap 160 extends between a pressure side end 168 and a suction side end 170. The pressure side end 168 can be connected to the pressure sidewall 132 of the composite core 130 and the suction side end 170 can be connected to the suction sidewall 134 of the composite core 130. In some embodiments, the trailing wrap 160 can be thicker at its leading edge 162 than at one or both of its pressure side end 168 and the suction side end 170. In other embodiments, the trailing wrap 160 can be thinner at its leading edge 162 than at one or both of its pressure side end 168 and the suction side end 170.

The leading wrap 180 can have different thicknesses as well. As noted above, the leading wrap 180 extends between a pressure side end 188 and a suction side end 190. The pressure side end 188 can be connected to the pressure sidewall 164 of the trailing wrap 160 and the suction side end 190 can be connected to the suction sidewall 166 of the trailing wrap 160. In some embodiments, the leading wrap 180 can be thicker at its leading edge 182 than at one or both of its pressure side end 188 and the suction side end 190. In other embodiments, the leading wrap 180 can be thinner at its leading edge 182 than at one or both of its pressure side end 188 and the suction side end 190.

Further, in some embodiments, as shown best in FIG. 3, the composite core 130 defines a pressure side camber distance D1 (represented by the dashed-dot line outlining the camber of the pressure sidewall 132) and a suction side camber distance D2 (represented by the dashed line outlining the camber of the suction sidewall 134). The pressure side camber distance D1 spans between the core leading edge 136 and the core trailing edge 138 along the pressure sidewall 132 of the composite core 130. The suction side camber distance D2 spans between the core leading edge 136 and the core trailing edge 138 along the suction sidewall 134 of the composite core 130.

In some embodiments, the trailing wrap 160 is wrapped around the core leading edge 136 of the composite core 130 such that trailing wrap 160 extends from the core leading edge 136 at least ten percent (10%) of the pressure side camber distance D1 and from the core leading edge 136 at least ten percent (10%) of the suction side camber distance D2. In other embodiments, the trailing wrap 160 is wrapped around the core leading edge 136 of the composite core 130 such that trailing wrap 160 extends from the core leading edge 136 at least twenty percent (20%) of the pressure side camber distance D1 and from the core leading edge 136 at least twenty percent (20%) of the suction side camber distance D2. In some other embodiments, the trailing wrap 160 is wrapped around the core leading edge 136 of the composite core 130 such that trailing wrap 160 extends from the core leading edge 136 at least fifty percent (50%) of the pressure side camber distance D1 and from the core leading edge 136 at least fifty percent (50%) of the suction side camber distance D2. In yet other embodiments, the trailing wrap 160 is wrapped around the core leading edge 136 of the composite core 130 such that trailing wrap 160 extends from the core leading edge 136 the entire pressure side camber distance D1 and from the core leading edge 136 the entire suction side camber distance D2.

In addition, in some embodiments, the leading wrap 180 is wrapped around the core leading edge 136 of the composite core 130 such that leading wrap 180 extends from the core leading edge 136 at least ten percent (10%) of the pressure side camber distance D1 and from the core leading edge 136 at least ten percent (10%) of the suction side camber distance D2. In some other embodiments, the leading wrap 180 is wrapped around the core leading edge 136 of the composite core 130 such that leading wrap 180 extends from the core leading edge 136 at least twenty percent (20%) of the pressure side camber distance D1 and from the core leading edge 136 at least twenty percent (20%) of the suction side camber distance D2. In other embodiments, the leading wrap 180 is wrapped around the core leading edge 136 of the composite core 130 such that leading wrap 180 extends from the core leading edge 136 at least fifty percent (50%) of the pressure side camber distance D1 and from the core leading edge 136 at least fifty percent (50%) of the suction side camber distance D2. In yet other embodiments, the leading wrap 180 is wrapped around the core leading edge 136 of the composite core 130 such that leading wrap 180 extends from the core leading edge 136 the entire pressure side camber distance D1 and from the core leading edge 136 the entire suction side camber distance D2.

Moreover, for this embodiment, the leading wrap 180 is wrapped around the core leading edge 136 of the composite core 130 such that leading wrap 180 extends further toward the core trailing edge 138 along at least one of the pressure side camber distance D1 and the suction side camber distance D2 than does the trailing wrap 160. As shown best in FIGS. 3 and 4, the leading wrap 180 is wrapped around the core leading edge 136 of the composite core 130 so that the leading wrap 180 extends further toward the core trailing edge 138 along the pressure side camber distance D1 than does the trailing wrap 160 and so that the leading wrap 180 extends further toward the core trailing edge 138 along the suction side camber distance D2 than does the trailing wrap 160. In alternative embodiments, the trailing wrap 160 is wrapped around the core leading edge 136 of the composite core 130 such that trailing wrap 160 extends further toward the core trailing edge 138 along at least one of the pressure side camber distance D1 and the suction side camber distance D2 than does the leading wrap 180. In some further embodiments, the leading wrap 180 and the trailing wrap are wrapped around the core leading edge 136 of the composite core 130 such that leading wrap 180 and the trailing wrap 160 terminate at the same point along the pressure side camber distance D1. Additionally or alternatively, in some embodiments, the leading wrap 180 and the trailing wrap are wrapped around the core leading edge 136 of the composite core 130 such that leading wrap 180 and the trailing wrap 160 terminate at the same point along the suction side camber distance D2.

With reference generally to FIGS. 2 through 6, the leading edge wrap 150 can be applied to the composite core 130 to form the airfoil 120 using a suitable method. As one example, the composite core 130 can be laid up in a suitable manner to specification. The trailing wrap 160 can then be wrapped around the core leading edge 136 of the composite core 130. More specifically, the pressure sidewall 164 of the trailing wrap 160 can be connected to or positioned adjacent to the pressure sidewall 132 of the composite core 130 and the suction sidewall 166 of the trailing wrap 160 can be connected to or positioned adjacent to the suction sidewall 134 of the composite core 130. In some embodiments, the trailing wrap 160 is constructed of a composite material prepreg or dry fabric and the composite core 130 can be constructed as an airfoil preform.

The trailing wrap 160 can have a thickness that is at least 25% greater than the thickness of any of the plies of the composite core 130. Further, the trailing wrap 160 can span the entire span length SL (FIG. 2) of the airfoil 120 or can span along a portion of the span length SL. The pressure side end 168 of the pressure sidewall 164 can form a butt joint with an outer ply that forms the pressure sidewall 132 of the composite core 130. Similarly, the suction side end 170 of the suction sidewall 166 can form a butt joint with an outer ply that forms the suction sidewall 134 of the composite core 130, e.g., as shown in FIG. 4.

With the trailing wrap 160 wrapped around the core leading edge 136 of the composite core 130, the leading wrap 180 can be wrapped around the core leading edge 136 of the composite core 130 as well. For instance, the pressure sidewall 184 of the leading wrap 180 can be connected to or positioned adjacent to the pressure sidewall 164 of the trailing wrap 160 and the suction sidewall 186 of the leading wrap 180 can be connected to or positioned adjacent to the suction sidewall 164 of the trailing wrap 160. The leading wrap 180 is thinner than the trailing wrap 160. Further, the leading wrap 180 can span the entire span length SL (FIG. 2) of the airfoil 120 or can span along a portion of the span length SL. The pressure side end 188 of the pressure sidewall 184 can form a lap-shear joint with the outer ply that forms the pressure sidewall 132 of the composite core 130. Similarly, the suction side end 190 of the suction sidewall 186 can form a lap-shear joint with the outer ply that forms the suction sidewall 134 of the composite core 130, e.g., as shown in FIG. 4.

When the leading wrap 180 is wrapped the core leading edge 136, the leading edge 182 of the leading wrap 180 is spaced from the leading edge 162 of the trailing wrap 160. In this regard, a void or cavity is formed between the leading wrap 180 and the trailing wrap 160. The filler 200 can be inserted into the cavity between the leading wrap 180 and the trailing wrap 160. The filler 200 can completely fill the cavity. In some example embodiments, the leading edge wrap 180 can be laid onto a forming tool such that the leading wrap 180 is formed to specification. Then, the filler 200 can be positioned at the leading edge 182 of the leading wrap 180. Next, the composite core 130 with the trailing wrap 160 wrapped therearound can be laid up on the forming tool on top of the leading wrap 180 and filler 200. The filler 200 can take its desired shape to fill the cavity between the leading wrap 180 and the trailing wrap 160. The whole airfoil 120 can then be removed from the forming tool and the lap-shear joints between the leading wrap 180 and the composite core 130 can be further secured. The protective nose 210 can be applied to the leading edge 182 of the leading wrap 180 to further protect the leading edge of the airfoil 120. In addition, the entire airfoil or a portion thereof can be coated with the protective coating 220.

In some embodiments, the leading wrap 180 can be constructed of a composite material prepreg or dry fabric, and as noted above, the trailing wrap 160 can likewise be constructed of a composite material prepreg. The trailing and leading wraps 160, 180 can be wrapped around the core leading edge 136 of the composite core 130 as described above such that they are net molded to specification. As the leading edge wrap 150 is net molded, there is generally no need to machine the leading edge radius to specification. The leading edge of the airfoil 120 is defined by thickness of the trailing and leading wraps 160, 180 and the geometry of the cross section of the airfoil 120. Advantageously, the non-metallic leading edge wrap 150 can provide protection for the leading edge of the airfoil 120, such as against FOD and bird strikes.

Figure 7:
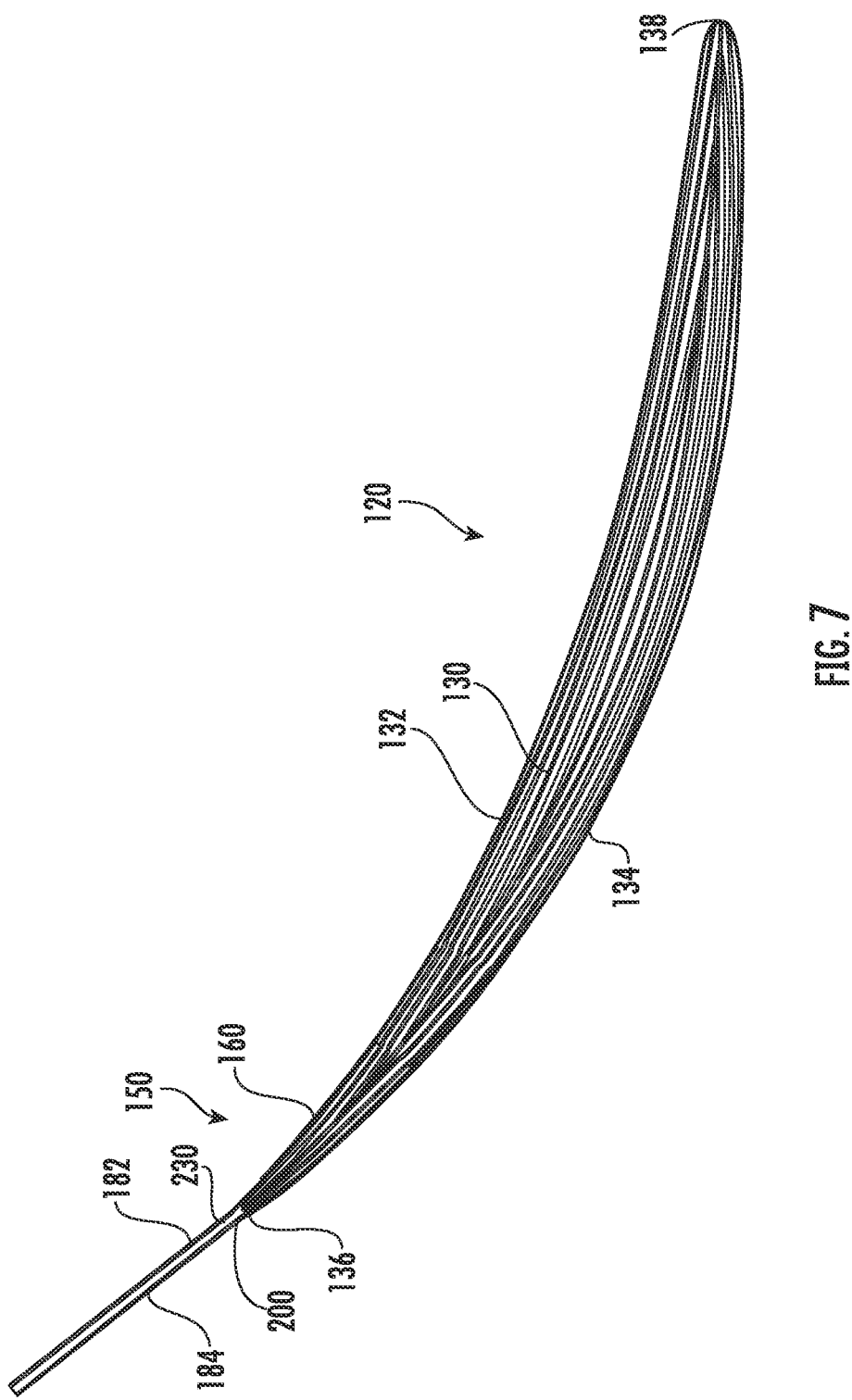
FIG. 7 provides a cross-sectional view of an airfoil having a leading edge wrap prior to being machined.
Figure 8:
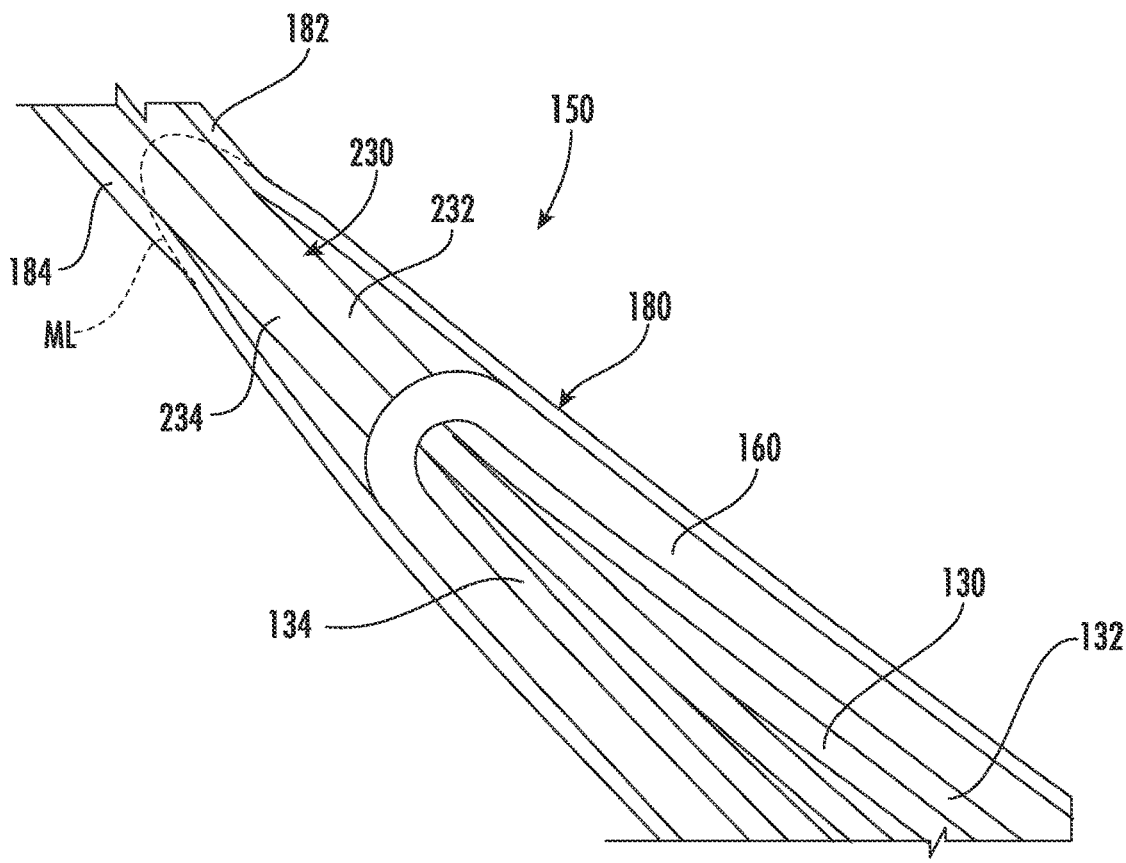
FIG. 8 provides a close-up cross-sectional view of a leading edge wrap of the airfoil of FIG. 7.
Figure 9:
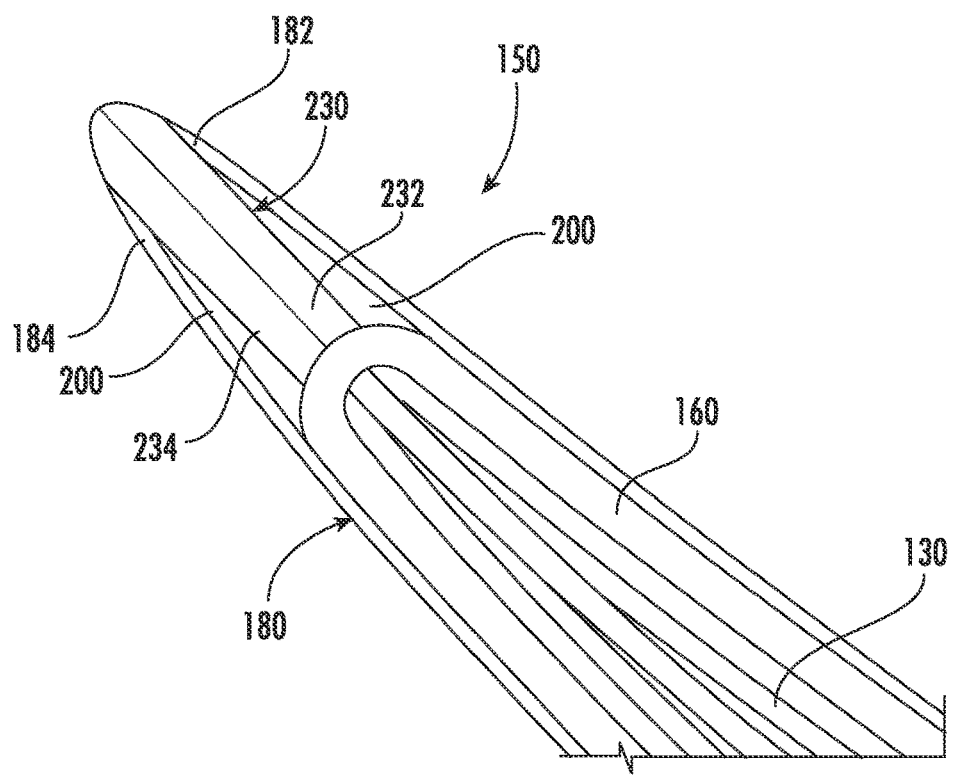
FIG. 9 provides a close-up cross-sectional view of the leading edge wrap of the airfoil of FIG. 7 after the leading edge wrap has been machined to specification.

With reference now to FIGS. 7, 8, and 9, various views are provided showing a progression of how an engine component having a composite airfoil equipped with a leading edge protective wrap is formed to specification according to example embodiment of the present disclosure. Particularly, FIG. 7 provides a cross-sectional view of an airfoil 120 having a leading edge wrap 150 prior to being machined. For this embodiment, the airfoil 120 is a part of a fan blade of an aviation gas turbine engine. FIG. 8 provides a close-up cross-sectional view of the leading edge wrap 150 of the airfoil 120 of FIG. 7. FIG. 9 provides a close-up cross-sectional view of the leading edge wrap 150 of the airfoil 120 of FIG. 7 after the leading edge wrap 150 has been machined to specification. Although the leading edge protective wrap 150 is disclosed in this example embodiment as being applied to a composite core airfoil of a fan blade for an aviation gas turbine engine, it will be appreciated that the leading edge protective wrap 150 can be applied to other suitable composite airfoils of a gas turbine engine or turbomachine.

The leading edge wrap 150 can be applied to the composite core 130 to form the airfoil 120 using a suitable method. As one example, the composite core 130 can be laid up to specification in a suitable manner. The trailing wrap 160 can then be wrapped around the core leading edge 136 of the composite core 130. Then, a pressure sidewall 184 or a suction sidewall 186 of the leading wrap 180 can be laid up on a forming tool. The composite core 130 and wrapped trailing wrap 160 can be laid up on the pressure sidewall 184 or the suction sidewall 186 depending on which one is laid up on the forming tool.

Next, a nose laminate 230 having one or more plies is laid up at least in part on the pressure sidewall 184 or the suction sidewall 186 depending on which one is laid up on the forming tool. For this embodiment, the nose laminate 230 has two plies, including a first ply 232 and a second ply 134. Notably, the nose laminate 230 forms a butt joint with the leading edge 162 of the trailing wrap 160. As shown best in FIG. 8, the first ply 232 and the second ply 134 each form a butt joint with the trailing wrap 160 at its leading edge 162. The nose laminate 230 extends outward from the trailing wrap 160 as shown best in FIG. 7. In some embodiments, the nose laminate 230 has at least two plies. In other embodiments, the nose laminate 230 has at least three plies. In yet other embodiments, the nose laminate 230 has at least four plies. In addition, in some embodiments, at least one ply 232, 234 of the nose laminate 230 and the trailing wrap 160 have the same thickness. For instance, as shown best in FIG. 8, the first and second plies 232, 234 both have the same thickness as the trailing wrap 160.

With the nose laminate 230 laid up on the pressure sidewall 184 or the suction sidewall 186 depending on which one is laid up on the forming tool, the sidewall of the leading wrap 180 that has not yet been laid up is laid up at least in part on the nose laminate 230 and at least in part on the trailing wrap 160. For instance, assuming the suction sidewall 134 of the leading wrap 180 is laid up on the forming tool initially, the pressure sidewall 132 can be laid up at least in part on the first ply 232 of the nose laminate 230 and at least in part on the trailing wrap 160 as shown best in FIG. 8.

Filler 200 can be added at any suitable stage, e.g., just before and/or after laying up the nose laminate 230. In some embodiments, filler 200 is positioned between at least one of: i) the nose laminate 230 and the pressure sidewall 184 of the leading wrap 180; and ii) the nose laminate 230 and the suction sidewall 186 of the leading wrap 180. In some embodiments, as shown best in FIGS. 8 and 9, filler 200 is positioned between the nose laminate 230 and the pressure sidewall 184 of the leading wrap 180 and between the nose laminate 230 and the suction sidewall 186 of the leading wrap 180. In this way, the cavity or voids between the nose laminate 230, the leading wrap 180, and the trailing wrap 160 are filled. This may advantageous mechanical properties.

With the composite core 130 and leading edge protective wrap 150 laid up, the extra stock can be machined off and the leading edge radius of the airfoil 120 can be shaped to specification. For instance, as shown best in FIG. 8, the leading edge protective wrap 150 can be machined to specification along machine line ML to form the leading edge radius.

FIG. 9 depicts the leading edge radius machined to specification. As shown in FIG. 9, for this embodiment, the resultant airfoil 120 has a composite core 130 having a pressure sidewall 132 and a suction sidewall 134 each extending between a core leading edge 136 and a core trailing edge 138. The airfoil 120 has a leading edge protective wrap 150. The leading edge protective wrap 150 has trailing wrap 160 wrapped around the core leading edge 136. The trailing wrap 160 is connected to or otherwise positioned adjacent to the pressure sidewall 132 and the suction sidewall 134 of the composite core 130. The trailing wrap 160 has a leading edge 162 and having a pressure sidewall 164 and a suction sidewall 166. The leading edge protective wrap 150 also has a nose laminate 230. The nose laminate 230 forms a butt joint with the leading edge 162 of the trailing wrap 160.

In addition, the leading edge protective wrap 150 has a leading wrap 180 having a pressure sidewall 182 and a suction sidewall 184. The pressure sidewall 182 of the leading wrap 180 is connected at least in part to the pressure sidewall 164 of the trailing wrap 160 and at least in part to the nose laminate 230, or more particularly, to the first ply 232 of the nose laminate 230. The suction sidewall 184 of the leading wrap 180 is connected at least in part to the suction sidewall 166 of the trailing wrap 160 and at least in part to the nose laminate 230, or more particularly, to the second ply 234 of the nose laminate 230. As depicted, the leading edge radius is formed in part by the nose laminate 230 and the leading wrap 180. In this regard, the pressure and suction sidewalls 182, 184 of the leading wrap 180 are not contiguous in this embodiment.

With reference now to FIGS. 10 and 11, various views are provided showing a progression of how an engine component having a composite airfoil equipped with a non-metallic leading edge protective wrap is formed to specification according to example embodiment of the present disclosure. Particularly, FIG. 10 provides a cross-sectional view of an airfoil 120 having a leading edge wrap 150 prior to being machined. For this embodiment, the airfoil 120 is a part of a fan blade of an aviation gas turbine engine. FIG. 11 provides a close-up cross-sectional view of the leading edge wrap 150 of the airfoil 120 of FIG. 10 after being machined to specification. Although the leading edge protective wrap 150 is disclosed in this example embodiment as being applied to a composite core airfoil of a fan blade for an aviation gas turbine engine, it will be appreciated that the leading edge protective wrap 150 can be applied to other suitable composite airfoils of a gas turbine engine or turbomachine.

For this embodiment, the leading edge wrap 150 is a single 3D woven wrap. That is, the 3D woven leading edge wrap 150 is formed of a non-metallic 3D woven material. The 3D woven wrap 150 can be an engineered multi-axis woven or braided fiberglass structure, for instance. In some embodiments, the 3D woven wrap 150 can be constructed from a composite multifilament yarn. Using such a multifilament yarn allows for a Resin Transfer Molding (RTM) or RTM resin to mechanically bond/lock the 3D woven wrap 150 in place with respect to the composite core 130. In this regard, the 3D woven wrap 150 need not be reliant or as reliant on chemical bonding as in conventional metallic leading edge structures. In some embodiments, the 3D woven leading edge wrap 150 can be co-molded with the composite core 130. In some embodiments, the 3D woven leading edge wrap 150 can include fiberglass fibers woven in a 3D pattern. In other embodiments, the 3D woven leading edge wrap 150 can include silicon fibers woven in a 3D pattern.

As depicted, the 3D woven leading edge wrap 150 has a pressure sidewall 254 and a suction sidewall 256. The 3D woven leading edge protective wrap 150 is wrapped around the core leading edge 136 and is connected to the pressure sidewall 132 and the suction sidewall 134 of the composite core 130. The pressure sidewall 254 of the 3D woven leading edge wrap 150 terminates at a pressure side end 258 and the suction sidewall 256 terminates at a suction side end 260. Notably, the pressure sidewall 254 tapers from a pressure taper point 262 to the pressure side end 258 and the suction sidewall 256 tapers from a suction taper point 264 to the suction side end 266. The tapering of the pressure and suction sidewalls 254, 256 creates a smooth transition between the plies of the composite core 130 and the 3D woven leading edge protective wrap 150. Furthermore, for this embodiment, the suction sidewall 256 of the 3D woven leading edge protective wrap 150 extends along its suction side camber than does the pressure sidewall 254 along its pressure side camber as shown in FIGS. 10 and 11. The 3D woven leading edge protective wrap 150 can span the entire span length SL (FIG. 2) of the airfoil 120 or can span along a portion of the span length SL.

The 3D woven leading edge wrap 150 can be applied to the composite core 130 to form the airfoil 120 in the following example manner. The 3D woven leading edge wrap 150 can be wrapped around the core leading edge 136 of the composite core 130. Particularly, the pressure sidewall 254 of the 3D woven leading edge wrap 150 is connected to or otherwise positioned adjacent to the pressure sidewall 132 of the composite core 130 and the suction sidewall 256 of the 3D woven leading edge wrap 150 is connected to or otherwise positioned adjacent to the suction sidewall 134 of the composite core 130. The 3D woven leading edge wrap 150 is wrapped tightly around the core leading edge 136 of the composite core 130 so that there are no resulting voids or cavities. Notably, the composite core 130 is laid up to account for the 3D woven leading edge wrap 150 to be wrapped or applied thereto. Particularly, the pressure sidewall 132 and the suction sidewall 134 of the composite core 130 can be laid up to account for the tapered geometry of the 3D woven leading edge wrap 150. The complementary lay up of the composite core 130 facilitates placement or wrapping of the 3D woven leading edge wrap 150 onto the composite core 130.

As shown best in FIG. 10, the 3D woven leading edge wrap 150 initially has excess stock 270 extending generally outward from where the pressure sidewall 254 and the suction sidewall 256 connect. To create the leading edge 252 (FIG. 11) and the radius of the leading edge of the airfoil 120 more generally, the excess stock 270 is machined away using a suitable machining technique. As shown in FIG. 11, the leading edge 252 and the radius of the airfoil 120 have been machined to specification. Thereafter, optionally, a protective nose (not shown) can be applied to the leading edge 252 for extra protection. Furthermore, optionally, one or more protective coatings can be applied to the airfoil 120.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. An airfoil for a turbine engine, the airfoil comprising: a composite core having a pressure sidewall and a suction sidewall extending between a core leading edge and a core trailing edge; a leading edge protective wrap, comprising: a trailing wrap wrapped around the core leading edge and connected to the pressure sidewall and the suction sidewall of the composite core, the trailing wrap having a leading edge and having a pressure sidewall and a suction sidewall; a leading wrap wrapped around the core leading edge and the leading edge of the trailing wrap and connected to the pressure sidewall and the suction sidewall of the trailing wrap, the leading wrap having a leading edge that is spaced from the leading edge of the trailing wrap; and a filler positioned between the leading edge of the trailing wrap and the leading edge of the leading wrap.
2. The airfoil of any preceding clause, further comprising: a protective nose connected to the leading edge of the leading wrap.
3. The airfoil of any preceding clause, wherein the trailing wrap and the leading wrap are formed of a non-metallic material.
4. The airfoil of any preceding clause, wherein the non-metallic material is a fibrous composite material.
5. The airfoil of any preceding clause, wherein the fibrous composite material is formed of at least one of an S-glass, carbon, E-glass, and Kevlar material.
6. The airfoil of any preceding clause, wherein the trailing wrap has a first thickness and the leading wrap has a second thickness that is less thick than the first thickness.
7. The airfoil of any preceding clause, wherein the second thickness of the leading wrap is less than half the first thickness of the trailing wrap.
8. The airfoil of any preceding clause, wherein the second thickness of the leading wrap is less than one third the first thickness of the trailing wrap.
9. The airfoil of any preceding clause, wherein the composite core defines a pressure sidewall camber distance and a suction sidewall camber distance, the pressure sidewall camber distance spans between the core leading edge and the core trailing edge along the pressure sidewall of the composite core and the suction sidewall camber distance spans between the core leading edge and the core trailing edge along the suction sidewall of the composite core, and wherein the trailing wrap is wrapped around the core leading edge of the composite core such that trailing wrap extends from the core leading edge at least twenty percent of the pressure sidewall camber distance and from the core leading edge at least twenty percent of the suction sidewall camber distance.
10. The airfoil of any preceding clause, wherein at least one of the leading wrap and the trailing wrap has fibers that wrap unbroken around the core leading edge.
11. The airfoil of any preceding clause, wherein the filler is formed of at least one of a resin, an adhesive, composite tows, a 2D weave, a 3D weave, rolled fibers, and a preform.
12. The airfoil of any preceding clause, wherein the composite core extends between a base and a tip defining a span length, and wherein the leading wrap, the trailing wrap, and the filler extend the span length of the composite core.
13. The airfoil of any preceding clause, wherein the leading wrap extends between a pressure side end and a suction side end, the pressure side end being connected to the pressure sidewall of the trailing wrap and the suction side end being connected to the suction sidewall of the trailing wrap, and wherein the leading wrap is thinner at the leading edge of the leading wrap than at one or both of the pressure side end and the suction side end.
14. The airfoil of any preceding clause, wherein the trailing wrap extends between a pressure side end and a suction side end, the pressure side end being connected to the pressure sidewall of the composite core and the suction side end being connected to the suction sidewall of the composite core, and wherein the trailing wrap is thinner at the leading edge of the trailing wrap than at one or both of the pressure side end and the suction side end.
15. An airfoil for a turbine engine, the airfoil comprising: a composite core having a pressure sidewall and a suction sidewall each extending between a core leading edge and a core trailing edge; a leading edge protective wrap, comprising: a trailing wrap wrapped around the core leading edge and connected to the pressure sidewall and the suction sidewall of the composite core, the trailing wrap having a pressure sidewall and a suction sidewall; a nose laminate, the nose laminate forming a butt joint with the leading edge of the trailing wrap; and a leading wrap having a pressure sidewall and a suction sidewall, the pressure sidewall of the leading wrap being connected at least in part to the pressure sidewall of the trailing wrap and at least in part to the nose laminate, the suction sidewall of the leading wrap being connected at least in part to the suction sidewall of the trailing wrap and at least in part to the nose laminate.

16. The airfoil of any preceding clause, further comprising: a filler positioned between at least one of: the nose laminate and the pressure sidewall of the leading wrap, and the nose laminate and the suction sidewall of the leading wrap.

17. The airfoil of any preceding clause, wherein the nose laminate has at least two plies, and wherein at least one ply of the at least two plies of the nose laminate and the trailing edge wrap have the same thickness.

18. An airfoil for a turbine engine, the airfoil comprising: a composite core having a pressure sidewall and a suction sidewall extending between a core leading edge and a core trailing edge; and a leading edge protective wrap wrapped around the core leading edge and connected to the pressure sidewall and the suction sidewall of the composite core, the leading edge protective wrap being formed of a 3D woven material.

19. The airfoil of any preceding clause, wherein the leading edge protective wrap has a leading edge, a pressure sidewall connected to the pressure sidewall of the composite core, and a suction sidewall connected to the suction sidewall of the composite core.

20. The airfoil of any preceding clause, wherein the pressure sidewall of the leading edge protective wrap tapers from a pressure taper point positioned along the pressure sidewall of the leading edge protective to a pressure side end of the leading edge protective wrap and the suction sidewall of the leading edge protective wrap tapers from a suction taper point positioned along the suction sidewall of the leading edge protective to a suction side end of the leading edge protective wrap.

21. A method of forming an airfoil, comprising: laying up a composite core, the composite core having a first sidewall and a second sidewall connected at a core leading edge; wrapping a trailing wrap around the core leading edge of the composite core, the trailing wrap having a first sidewall and a second sidewall connected at a leading edge; and wrapping a leading wrap around the core leading edge of the composite core and the leading edge of the trailing wrap.

22. The method of any preceding clause, further comprising: inserting a filler between the leading edge of the trailing wrap and the leading edge of the leading wrap.

23. The method of any preceding clause, further comprising: connecting a protective nose to the leading edge of the leading wrap.

24. The method of any preceding clause, wherein the trailing wrap is formed of a non-metallic material.

25. The method of any preceding clause, wherein the leading wrap is formed of a non-metallic material.

26. The method of any preceding clause, wherein the trailing wrap and the leading wrap are formed of a non-metallic material.

27. The method of any preceding clause, wherein the non-metallic material forming the leading wrap and/or the trailing wrap is a fibrous composite material.

28. The method of any preceding clause, wherein the fibrous composite material is formed of at least one of an S-glass, carbon, E-glass, and Kevlar material.

29. The method of any preceding clause, wherein the trailing wrap has a first thickness and the leading wrap has a second thickness that is less thick than the first thickness.

30. The method of any preceding clause, wherein the second thickness of the leading wrap is less than half the first thickness of the trailing wrap.

31. The method of any preceding clause, wherein the second thickness of the leading wrap is less than one third the first thickness of the trailing wrap.

32. The method of any preceding clause, wherein the composite core defines a pressure sidewall camber distance and a suction sidewall camber distance, the pressure sidewall camber distance spans between the core leading edge and the core trailing edge along the pressure sidewall of the composite core and the suction sidewall camber distance spans between the core leading edge and the core trailing edge along the suction sidewall of the composite core, and wherein the trailing wrap is wrapped around the core leading edge of the composite core such that trailing wrap extends from the core leading edge at least twenty percent of the pressure sidewall camber distance and from the core leading edge at least twenty percent of the suction sidewall camber distance.

33. The method of any preceding clause, wherein at least one of the leading wrap and the trailing wrap has fibers that wrap unbroken around the core leading edge.

34. The method of any preceding clause, wherein at least one of the leading wrap and the trailing wrap is formed of a 3D weave having fibers that wrap unbroken around the core leading edge.

35. The method of any preceding clause, wherein at least one of the leading wrap and the trailing wrap is formed of a 2D weave having fibers that wrap unbroken around the core leading edge.

36. The method of any preceding clause, wherein the filler is formed of at least one of a resin, an adhesive, composite tows, a 2D weave, a 3D weave, rolled fibers, and a preform.

37. The method of any preceding clause, wherein the composite core extends between a base and a tip defining a span length, and wherein the leading wrap, the trailing wrap, and the filler extend the span length of the composite core.

38. The method of any preceding clause, wherein the leading wrap extends between a pressure side end and a suction side end, the pressure side end being connected to the pressure sidewall of the trailing wrap and the suction side end being connected to the suction sidewall of the trailing wrap, and wherein the leading wrap is thinner at the leading edge of the leading wrap than at one or both of the pressure side end and the suction side end.

39. The method of any preceding clause, wherein the trailing wrap extends between a pressure side end and a suction side end, the pressure side end being connected to the pressure sidewall of the composite core and the suction side end being connected to the suction sidewall of the composite core, and wherein the trailing wrap is thinner at the leading edge of the trailing wrap than at one or both of the pressure side end and the suction side end.

40. A method of forming an airfoil, comprising: laying up a composite core, the composite core having a core leading edge; wrapping a trailing wrap around the core leading edge of the composite core, the trailing wrap having a first sidewall and a second sidewall connected at a leading edge; laying up a first sidewall of a leading wrap along the first sidewall of the trailing wrap; laying up a nose laminate at least in part on the first sidewall of the leading wrap, the nose laminate forming a butt joint with the leading edge of the trailing wrap; laying up a second sidewall of the leading wrap at least in part on the nose laminate and at least in part on the second sidewall of the trailing wrap; and machining a leading edge radius of the airfoil.

41. The method of any preceding clause, further comprising: adding filler between the first sidewall of the leading wrap and the nose laminate.
42. The method of any preceding clause, further comprising: adding filler between the second sidewall of the leading wrap and the nose laminate.
43. The method of any preceding clause, wherein the first sidewall of the trailing wrap is thicker than the first sidewall of the leading wrap.
44. The method of any preceding clause, wherein the second sidewall of the trailing wrap is thicker than the second sidewall of the leading wrap.
45. The method of any preceding clause, wherein the nose laminate is formed of at least two plies.
46. The method of any preceding clause, wherein the leading edge radius is formed in part by the nose laminate and in part by the leading wrap, wherein the first sidewall and the second sidewall of the leading wrap are not contiguous at the leading edge radius of the airfoil.
47. The method of any preceding clause, wherein the airfoil is a component of an aviation gas turbine engine.
48. The method of any preceding clause, wherein the airfoil is a component of a compressor of an aviation gas turbine engine.
49. The method of any preceding clause, wherein the airfoil is a component of a turbine of an aviation gas turbine engine.
50. The method of any preceding clause, wherein the airfoil is a component of a fan of a turbofan.
51. The method of any preceding clause, wherein the first sidewall and the second sidewall of the trailing wrap are a suction sidewall and pressure sidewall, respectively.
52. The method of any preceding clause, wherein the first sidewall and the second sidewall of the leading wrap are a suction sidewall and pressure sidewall, respectively.
53. A method of forming an airfoil, comprising: laying up a composite core, the composite core having a first sidewall and a second sidewall connected at a core leading edge; and wrapping a 3D woven leading edge wrap around the core leading edge.
54. The method of any preceding clause, further comprising: machining the 3D woven leading edge wrap to form a leading edge radius of the airfoil.
55. The method of any preceding clause, wherein the 3D woven leading edge wrap if formed of a non-metallic 3D woven material.
56. The method of any preceding clause, wherein the 3D woven leading edge wrap is wrapped around the core leading edge such that a first sidewall of the 3D woven leading edge wrap is positioned adjacent to a first sidewall of the composite core and a second sidewall of the 3D woven leading edge wrap is positioned adjacent to a second sidewall of the composite core.
57. The method of any preceding clause, wherein the 3D woven leading edge wrap is wrapped around the core leading edge of the composite core so that there are no resulting voids or cavities between the 3D woven leading edge wrap and the composite core.
58. The method of any preceding clause, wherein a first sidewall of the 3D woven leading edge wrap tapers from a first taper point to an end of the first sidewall. Additionally or alternatively, a second sidewall of the 3D woven leading edge wrap tapers from a second taper point to an end of the second sidewall.
59. The method of any preceding clause, wherein the 3D woven leading edge wrap is co-molded with the composite core.
60. The method of any preceding clause, wherein the 3D woven leading edge wrap is an engineered multi-axis woven structure.
61. The method of any preceding clause, wherein the 3D woven leading edge wrap is a braided fiberglass structure.
62. The method of any preceding clause, wherein the 3D woven leading edge wrap is formed of a composite multifilament yarn.
63. The method of any preceding clause, wherein the 3D woven leading edge wrap is formed of silicon fibers woven in a 3D pattern.

What is claimed is:

1. An airfoil for a turbine engine, the airfoil comprising:
a composite core having a pressure sidewall and a suction sidewall extending between a core leading edge and a core trailing edge, wherein the composite core comprises a ceramic matrix composite or a polymer matrix composite; and
a leading edge protective wrap, comprising:
a trailing wrap wrapped around the core leading edge and connected to the pressure sidewall and the suction sidewall of the composite core, the trailing wrap having a leading edge and having a pressure sidewall and a suction sidewall;
a leading wrap wrapped around the core leading edge and the leading edge of the trailing wrap and directly connected to the pressure sidewall and the suction sidewall of the trailing wrap, the leading wrap having a leading edge that is spaced from the leading edge of the trailing wrap, wherein the leading wrap terminates at one end at a first termination point directly connected to the pressure sidewall of the trailing wrap and at its other end at a second termination point directly connected to the suction sidewall of the trailing wrap, the trailing wrap and the leading wrap defining a cavity between the leading edge of the trailing wrap and the leading edge of the leading wrap; and
a filler inserted into the cavity.

2. The airfoil of claim 1, further comprising:
a protective nose connected to the leading edge of the leading wrap.

3. The airfoil of claim 1, wherein the trailing wrap and the leading wrap are formed of a non-metallic material.

4. The airfoil of claim 3, wherein the non-metallic material is a fibrous composite material.

5. The airfoil of claim 4, wherein the fibrous composite material is formed of at least one of an S-glass, carbon, E-glass, and Kevlar material.

6. The airfoil of claim 1, wherein the trailing wrap has a first thickness and the leading wrap has a second thickness that is less thick than the first thickness.

7. The airfoil of claim 6, wherein the second thickness of the leading wrap is less than half the first thickness of the trailing wrap.

8. The airfoil of claim 6, wherein the second thickness of the leading wrap is less than one third the first thickness of the trailing wrap.

9. The airfoil of claim 1, wherein the composite core defines a pressure sidewall camber distance and a suction sidewall camber distance, the pressure sidewall camber distance spans between the core leading edge and the core trailing edge along the pressure sidewall of the composite core and the suction sidewall camber distance spans between the core leading edge and the core trailing edge along the suction sidewall of the composite core, and wherein the trailing wrap is wrapped around the core leading edge of the composite core such that trailing wrap extends from the core leading edge at least twenty percent of the pressure sidewall camber distance and from the core leading edge at least twenty percent of the suction sidewall camber distance.

10. The airfoil of claim 1, wherein at least one of the leading wrap and the trailing wrap has fibers that wrap unbroken around the core leading edge.

11. The airfoil of claim 1, wherein the filler is formed of at least one of a resin, an adhesive, composite tows, a 2D weave, a 3D weave, rolled fibers, and a preform.

12. The airfoil of claim 1, wherein the composite core extends between a base and a tip defining a span length, and wherein the leading wrap, the trailing wrap, and the filler extend the span length of the composite core.

13. The airfoil of claim 1, wherein the leading wrap extends between a pressure side end and a suction side end, the pressure side end being connected to the pressure sidewall of the trailing wrap and the suction side end being connected to the suction sidewall of the trailing wrap, and wherein the leading wrap is thinner at the leading edge of the leading wrap than at one or both of the pressure side end and the suction side end.

14. The airfoil of claim 1, wherein the trailing wrap extends between a pressure side end and a suction side end, the pressure side end being connected to the pressure sidewall of the composite core and the suction side end being connected to the suction sidewall of the composite core, and wherein the trailing wrap is thinner at the leading edge of the trailing wrap than at one or both of the pressure side end and the suction side end.

\* \* \* \* \*